Figure 1:
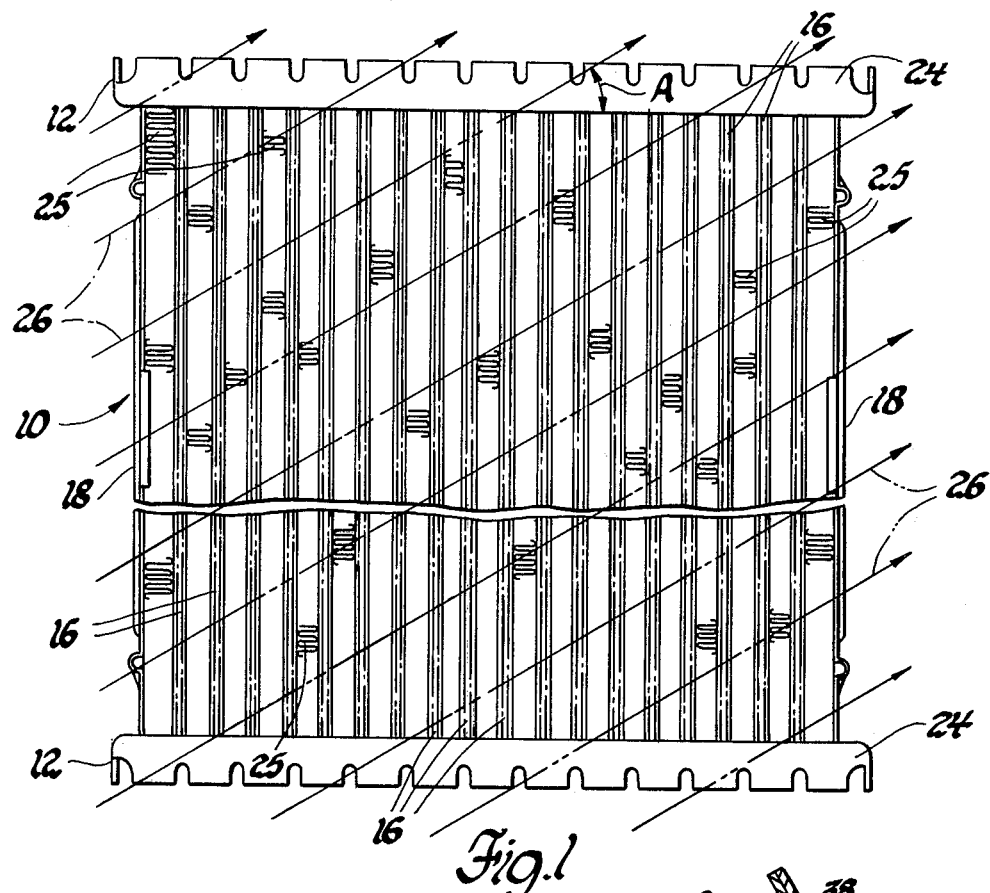

United States Patent [19]
Brittin

[11] 4,433,227
[45] Feb. 21, 1984

[54] METHOD OF INDUCTIVELY HEATING WORKPIECES TO A UNIFORM TEMPERATURE

[75] Inventor: Craig E. Brittin, Lockport, N.Y.

[73] Assignee: General Motors Corporation, Detroit, Mich.

[21] Appl. No.: 419,942

[22] Filed: Sep. 20, 1982

[51] Int. Cl.³ .............................................. H05B 6/06
[52] U.S. Cl. .................. 219/10.41; 219/8.5; 219/9.5; 219/10.53; 219/10.67
[58] Field of Search ...................... 219/10.41, 9.5, 8.5, 219/7.5, 10.53, 10.57, 10.67, 85 A, 10.49, 10.69, 85 BA

[56] References Cited

U.S. PATENT DOCUMENTS

| | | | |
|---|---|---|---|
| 2,448,690 | 9/1948 | Storm | 219/9.5 |
| 2,684,425 | 7/1954 | Vickland | 219/9.5 |
| 3,251,976 | 5/1966 | McBrien | 219/10.69 |

FOREIGN PATENT DOCUMENTS 385285 1/1933 United Kingdom .

OTHER PUBLICATIONS

*Welding Journal;* Nov. 1959; pp. 1059–1069; Libsch, Joseph and Capolongo, Pat.; "High-Frequency Induction Brazing and Soldering".

*Primary Examiner*—Roy N. Envall, Jr.
*Assistant Examiner*—M. M. Lateef
*Attorney, Agent, or Firm*—Warren D. Hill

[57] ABSTRACT

A heat exchanger assembly is formed of spaced parallel headers connected by an array of spaced flat tubes each in a plane perpendicular to the headers. The header and tube material is clad with a brazing alloy which melts at a temperature slightly below the melting point of the base material. Sinuous metallic ribbons fill the spaces between the flat tubes. The assembly is induction heated by a low frequency alternating magnetic field having its flux lines extending transversely of the tubes and headers and at oblique angles thereto, the angles being selected to cause equal heating thereof for obtaining a uniform temperature throughout the assembly to effect the melting of the alloy and the brazing of the joints. Heat panels heated by the magnetic field to a temperature near that of the assembly are placed opposite outer surfaces of the assembly as required to avoid a radiation loss which would cause a significant temperature differential. Heat panels are also used in the brazing of a heat exchanger assembly comprising a stack of contoured plates to attain uniform heating of the assembly.

8 Claims, 11 Drawing Figures

METHOD OF INDUCTIVELY HEATING WORKPIECES TO A UNIFORM TEMPERATURE

This invention relates to a method of induction heating and more particularly to such a method which effects uniform heating of a plurality of members simultaneously.

In the manufacture of heat exchangers for example those such as evaporators and heater cores used in automotive vehicles, the various elements of the assembly such as headers, tubes and fins are joined by brazing. To obtain secure, leakproof joints, especially between the tubes and headers, it is essential to heat the assembly uniformly to a narrow temperature range. Typically, the brazing material is an alloy clad on the core stock of the assembly elements and during the brazing operation the alloy material melts at a temperature a few degrees lower than the melting temperature of the core material. Thus accuracy and uniformity of the heating to obtain proper joints is essential. Due to the complexity of such a heat exchanger traditional induction heating techniques have not been successful. A recurring problem is that where several elements are combined into an assembly there is a net loss of radiant energy from certain external surfaces which is not experienced by inner protected portions of the assembly and the radiant energy loss results in an unacceptable temperature differential. Moreover, in order to improve the economies of manufacture it is often desired to simultaneously inductively heat several members or assemblies arranged side by side and there the undesirable temperature differentials arising from radiant heat loss from the outer members or assemblies of a group will occur.

It is, therefore, a general object of this invention to provide a method of induction heating of an assembly or a plurality of members where unacceptable temperature differentials on the assembly or among the members is avoided. In particular it is an object of the invention to provide a method of induction heating wherein radiation heat losses which give rise to such temperature differentials are reduced or eliminated.

The invention is carried out by arranging metal heat panels with respect to outer surfaces of workpieces in regions where undesirable radiation losses tend to occur and establishing an alternating magnetic field for heating the workpieces and heating the heat panels to a temperature near that of the workpieces to transfer heat to the outer surfaces by radiation or conduction which compensates for any radiation lost from the outer surfaces.

Figure 2:
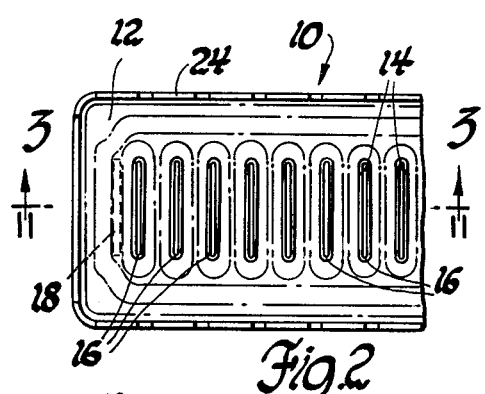
Figure 3:
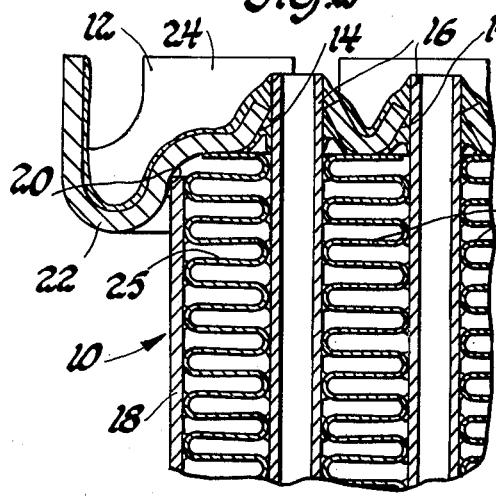
Figure 4:
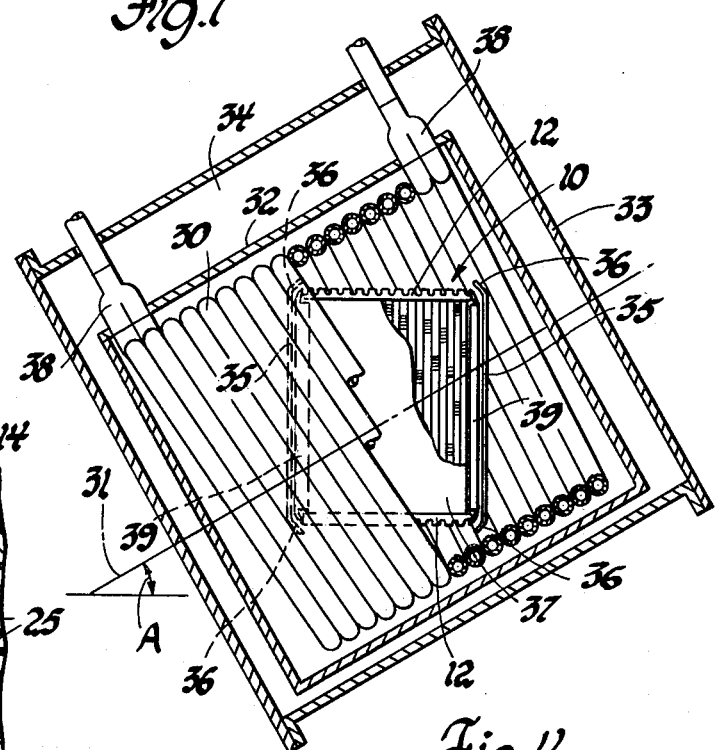
Figure 5:
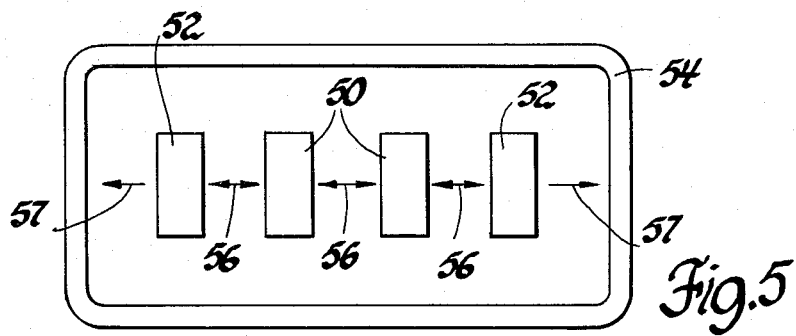
Figure 7:
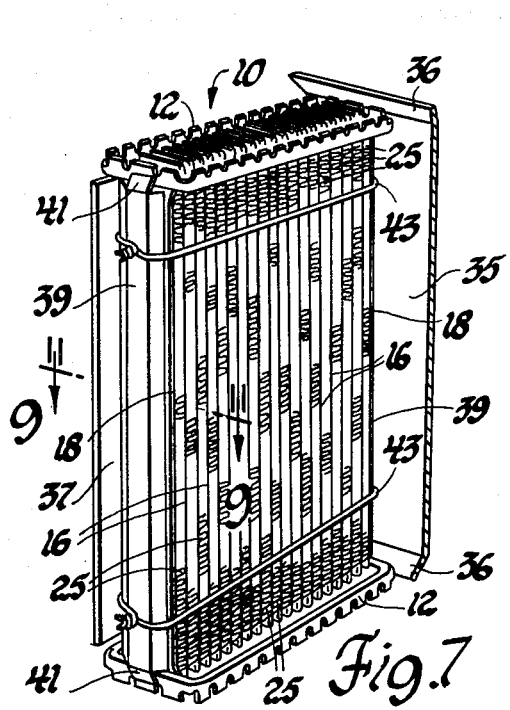
Figure 6:
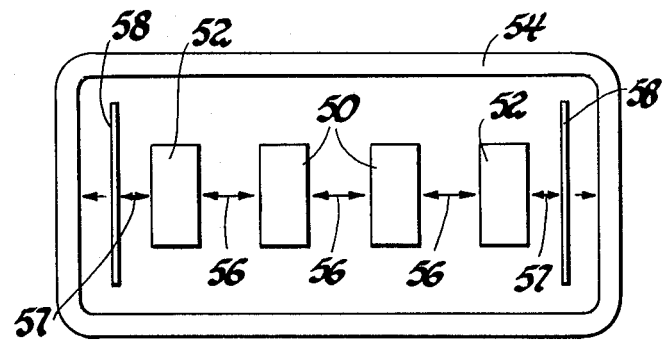
Figure 8:
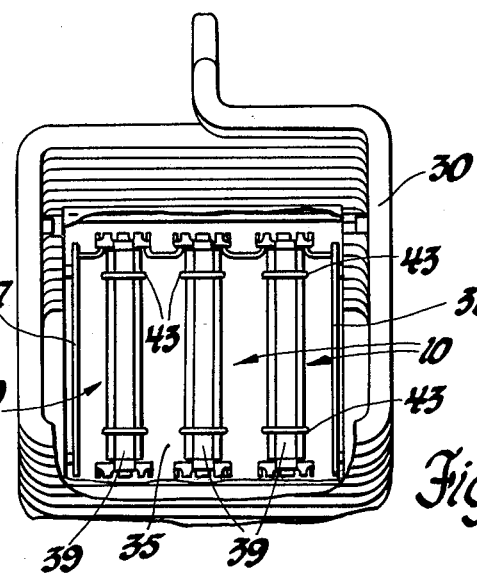
Figures 10, 11:
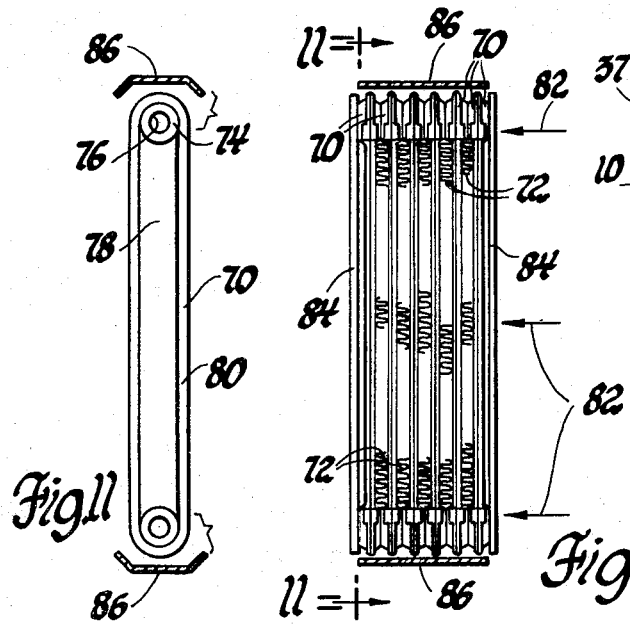
Figure 9:
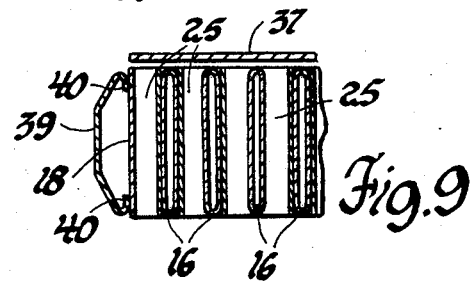

The above and other advantages will be made more apparent from the following specification taken in conjunction with the accompanying drawings wherein like reference numerals refer to like parts and wherein FIG. 1 is a side view of a heat exchanger assembly to be brazed according to the method of the invention, FIG. 2 is a partial top view of the heat exchanger of FIG. 1, FIG. 3 is a partial cross-sectional view of the heat exchanger taken along line 3—3 of FIG. 2, FIG. 4 is a sectional view of an induction heating apparatus including heat panels for carrying out the method of the invention, and a heat exchanger positioned within the apparatus, FIGS. 5 and 6 are diagrammatic views of parts positioned within an induction heating coil illustrating the dynamics of radiation loss and the prevention thereof respectively according to the invention, FIG. 7 is a view of a heat exchanger assembly equipped with heat panels according to the invention for avoiding radiation heat loss, FIG. 8 is a front view of the induction heating apparatus of FIG. 4 and a plurality of heat exchangers positioned within the apparatus showing the heat panels for carrying out the method of the invention, FIG. 9 is a cross-sectional view of the heat exchanger and a heat panel taken along lines 9—9 of FIG. 7, FIG. 10 is a side view of another type of heat exchanger assembly positioned between heat panels for induction heating according to the method of the invention, and FIG. 11 is a front view taken along lines 11—11 of the assembly of FIG. 10.

FIGS. 1, 2 and 3 of the drawings illustrate an aluminum heat exchanger which is used herein as an example of how the method of the invention may be applied. The many joints of the heat exchanger which must be leakproof require the use of a joining process which can be carefully controlled to provide a sound joint at every connection. Vacuum brazing is such a method.

The heat exchanger 10 shown in FIGS. 1, 2 and 3 comprises a pair of spaced parallel headers 12 each of which although not entirely flat lies primarily in a plane and each header has an array of transverse parallel elongated openings 14 which receive the ends of flat tubes 16 that extend in planes perpendicular to the planes of the header 12. The tubes extend between the two headers and are to be joined to the headers by brazing. A pair of side plates 18 one on each outer side surface of the heat exchanger extends between the headers 12 in a direction parallel to the tubes 16 and spaced from the nearest tube 16 by an amount equal to the separation between the tubes 16. The upper and lower ends of the side plate 18 abut against a shoulder 20 of the header which is defined by a peripheral rim 22 formed in the header. Side walls 24 normal to the general plane of the header comprise the periphery thereof and are used to attach a reservoir, not shown, to the portion of the heat exchanger described and illustrated herein. The attachment is made by crimping the wall 24 inwardly against a portion of the reservoir. The spaces between the tubes 16 and between the outer tube 16 and the side wall 18 contain fins 25 comprising sinuous ribbons of metal making contact with the tubes and side walls, respectively, and are to be brazed at the points of contact to assure good thermal conductivity.

The headers 12 are approximately 6.75 inches long by 2 inches wide. Each tube 16 is 9.5 inches long and has an internal opening of 0.9 inch by 0.08 inch. A total of 18 tubes are used spaced on 0.33 inch centers. The ribbon is about 1 inch wide and is formed sinuously to comprise 30 fins per inch, each fin extending predominantly parallel to the headers. The side plates are about 9 inches long and 1 inch wide. The headers, side plates and tubes are made of 3005 aluminum core material clad on one side, as required, with 4047 aluminum-silicon brazing alloy. The thickness of the cladding comprises about 10% of the thickness of the stock. The sinuous ribbon is 5005 aluminum unclad. The stock thickness for the header is 0.05 to 0.08 inch, for the tube it is 0.010 to 0.015 inch, for the side wall it is 0.015 to 0.025 inch and for the ribbon it is 0.003 to 0.006 inch. The melting range for the core material 3005 aluminum is 1165° to 1170° F. and the melting range for the 4047 aluminum brazing alloy is 1070° to 1080° F.

In view of the above structure and the melting ranges of the materials involved it is essential that the brazing occur in the narrow temperature range between the melting points. The range is even further narrowed by the phenomenom that the brazing alloy attacks the aluminum core material at high temperatures and alloys with it. Thus the high part of the allowable temperature range should be avoided. In practice, brazing should occur at 1095° to 1120° F. Since the joints between the tubes and the headers must be leakproof, great care must be exercised in bringing those elements, that is, the headers and the tubes, to the correct temperature. It is desired that each bend of the sinuous ribbon be brazed to its adjoining tube or side wall, however this connection is less critical than the tube to header joints. Thus the tube-to-header joints have a higher priority. Ideally then, both the headers 12 and the tube 16 are simultaneously raised to the brazing temperature so that alloy cladding on each will fuse and flow into the tube to header joints to perfect those joints.

The conventional vacuum brazing practice of joining such assemblies has comprised indirectly heating the assemblies by radiant energy from electrical resistance heaters on either side of the assemblies. The assemblies must be heated slowly so that the radiant heat applied to the outer surfaces can flow throughout the assembly to bring it to a uniform temperature in the desired range. This practice requires an expensive heating apparatus and uses the electrical energy inefficiently.

It is proposed here to heat the heat exchanger assembly directly by induction heating. The traditional practice for inductively heating a part is to apply an alternating magnetic field to the part symmetrically. In this case, however, if the field were applied perpendicular to the plane of the tubes and parallel to the headers, the tubes would be heated at a much faster rate than the headers. On the other hand, if the field were applied perpendicular to the headers they would heat faster than the tubes. It has been found that by applying the field to the part asymmetrically so that it cuts transversely through the planes of the headers and the tubes both set of elements can be heated to the brazing temperature at the same rate if the proper angles of the magnetic field to the planes of the elements are maintained. As shown in FIG. 1, a uniform magnetic field comprising flux lines 26 extends through heat exchanger assembly 10 and the flux lines are tilted by an angle A with respect to the plane of the header 12. Once this principle is known the specific angle A for any given assembly can be determined empirically by treating the tubes 16 and sinuous ribbon fins 25 as a unit called a core block. Its temperature can be measured by thermocouple and the temperature of the header 12 is likewise measured. Trials at different angles quickly reveal the specific angle A which is appropriate for a uniform heating of the unit assembly. A noticeable temperature difference between the header and the core block occurs as the angle is changed by a degree. For the specific heat exchanger structure described above, the angle A is 19° if a single heat exchanger is inductively heated in the induction heating apparatus to be described. If, on the other hand, three heat exchangers are placed side by side, and steel heat panels are placed adjacent the outer surfaces of the outer core blocks to avoid unequal heat losses from the three assemblies, then an angle A of 24° is optimum.

FIG. 4 depicts an induction heating apparatus for heat exchangers 10 and is specifically described for a unit with the capacity for three heat exchangers 10 mounted side by side. It should be noted first of all, that the heat exchangers 10 are mounted with the headers in a horizontal plane. This minimizes the gravitational effect on the fused brazing alloy. If the headers were tilted a few degrees the alloy would tend to run down hill from the joints with the result of starving joints on the upside of the assembly. The coil 30 is tilted with its central axis 31 at an angle A to the horizontal to attain the proper angular relationship of the magnetic field to the assembly 10. The coil is surrounded by a flux return path 32 to intensify the magnetic field to make the field more uniform within the coil and to prevent losses by the linking of the field outside the coil with the walls of the chamber. The chamber 34 which is essentially a steel box with a door 33 surrounds both the coil and the flux return path. Vacuum pumping apparatus, not shown, is coupled to the chamber for drawing the chamber to a vacuum of 1–10 microns. As an alternative configuration the chamber may be made of a dielectric, such as quartz, and small enough to fit within the coil. Then the vacuum pumping obviously would be more efficient due to the smaller chamber volume. A particular coil to be used for the FIG. 4 embodiment has dimensions $8\frac{1}{2}$ inches wide, $14\frac{1}{4}$ inches high and 15 inches deep. Thus the coil 30 is generally rectangular in cross-section but has appropriately rounded corners. The coil is constructed of copper tubing $\frac{3}{8}$ inch outer diameter and having 0.060 inch wall thickness and is cooled by water circulating through the tubing. The tubing is wrapped in tape and covered with epoxy. The coil ends are coupled to the coil body by Y connections 38 so that the coil is double wound with 16 double turns. A current of 1400 amperes is applied to the coil.

The flux return path 32 in the form of a box surrounding the coil may be made up of iron laminations but the preferred material is a compacted powdered iron which has a permeability on the order of 130 and a high electrical resistance. The powdered iron flux return path around the coil has a thickness of 1 inch and is spaced $\frac{1}{2}$ inch from the coil sides while the portions of the flux return path at the ends of the coil are adjacent the coil ends. The flux path material will not get hot so long as it is sufficiently thick to avoid saturation by the magnetic field. The flux return path efficiently channels the magnetic field outside the coil so that the field does not link with the walls of the chamber 34 to heat the chamber walls thereby introducing energy losses. In addition the flux return path because of its high permeability intensifies the magnetic field within the coil and it also shapes the field to render it much more uniform with the coil particularly near the ends so that a shorter coil might be used than if the flux return path were omitted.

The uniformity of heating of the heat exchanger assemblies is improved by avoiding or reducing radiation heat losses from certain external surfaces of the assembly. For example, heat radiated from the side plates 18 and the ends of the headers 12 would cause the side regions of the assembly to be cooler than the center. Steel end fixtures 39 are secured to the side plates to squeeze the tubes and fins together during brazing and also to be heated by the magnetic field to a temperature near that of the assembly to reduce heat loss from the side plates 18, thereby serving as heat panels. Further, vertical auxiliary steel panels 35 with end portions 36 inwardly tilted toward the headers are mounted opposite the ends of the assemblies by supports, not shown, and are inductively heated by the magnetic field to a temperature near that of the assemblies so that a net heat loss by radiation from the end of the headers 12 and side walls 18 to the cool coil 30 does not occur. When a plurality of assemblies are heated in side by side relationship the outside ones will tend to be cooler than inside ones due to the radiation losses and accordingly steel panels 37 are mounted at the sides of the outer radiator cores to prevent radiation losses in the same manner as the panels 35.

While it is known to use low frequencies for induction heating the usual practice is to use magnetic fields alternating at the rate of several thousand hertz, inasmuch as more effective energy coupling to the workpiece occurs at high frequency. A characteristic of induction heating which is particularly noticeable at high frequencies is the skin effect which causes direct heating of the peripheral portions of a part and inner portions then are heated by conduction from the peripheral portion thereby resulting in substantial temperature differentials within a part. This phenomenon is advantageously used where localized surface heating is desired. For the present application the temperature differentials, of course, are undesirable and thus a low frequency should be used. The frequency is to be selected low enough to uniformly heat the part but not so low as to be unnecessarily inefficient. The alternating magnetic field induces current flows along the periphery of the element in the field. The current density is maximum at the edge and falls off exponentially with distance into the element. To calculate heating the effective value of the current density may be assumed constant extending one "skin depth" from the edge. In this case the "skin depth" $\delta$ is given by $$\delta = \sqrt{\frac{2\rho}{\omega\mu_o}}$$

where
$\rho$ = Effective material resistivity
$\omega$ = Angular frequency
$\mu_o$ = Permeability of material For uniform heating the skin depth $\delta$ should be larger than half the element width. For the heat exchanger specifically described above a frequency less than 800 Hz is required. A test made on the heat exchanger shows that frequencies between 200 and 800 Hz can be used with the lower frequency being less efficient. The optimum frequency was found to be 400–600 Hz.

The heat transfer dynamics of a plurality of members being inductively heated as a group is schematically depicted in FIGS. 5 and 6. A pair of inner members 50 and two outer members 52 are arranged in a parallel array for heating inside a water-cooled heating coil 54. As the temperature of the members is raised by the magnetic field from the coil 54 heat is radiated from the members according to the temperature of the members. The arrows 56 depict the radiant energy emitted laterally from the member 50 toward each other or toward the outer members 52. Because the temperatures of the inner members 50 are close to that of adjacent members there is essentially no net transfer of energy laterally from the members 50. In essence, whatever radiation is emitted from one of the members 50 is compensated for by radiation returned by its neighboring member. In FIG. 5 the end members 52 radiate energy as represented by the arrows 57 toward the relatively cold coil 54 so that a new loss of radiant energy occurs which results in a lowering of the temperature of members 52 relative to the temperatures of the members 50. FIG. 6 illustrates how this energy loss can be avoided by placing adjacent the outer surface of the members 52 a radiator panel or heat panel 58 which is also heated by the magnetic field to a temperature close to that of the members 50 and 52 so that the outward radiation from the members 52 is compensated for by counter radiation from the panels 58. By this technique the members 50 and 52 can be uniformly heated. Radiator panels are spaced from the members being heated to radiate energy to the members and fixtures contacting the members for applying force thereto transfer energy to the members by conduction and usually radiation as well. The radiator panels and fixtures are inductively heated by the magnetic field and both are referred to collectively herein as "heat panels".

FIGS. 7 and 8 illustrate in detail how this improvement in induction heating is applied to the induction brazing of the heat exchanger assemblies of FIGS. 1-3 and which has generally been alluded to in FIG. 4. FIG. 7 shows how a fixture 39 serving as a heat panel is mounted on each end of the assembly 10 and held in place by wires 43 wrapped around the assembly. As shown in FIG. 9 each fixture 39 has an elongated C-shaped cross-section with bent-in edges 40 which contact the margins of the side plates 18 while the middle of the fixtures are spaced from the side plates. Upper and lower end tabs 41 engage the headers 12. The wired-on fixtures 39 compress the elements of the heat exchanger to assure good contact of the tubes 16 and fins 25 during brazing. In addition, the fixtures 39 are heated by the magnetic field to about the same temperature as the heat exchanger so that heat transfer between the fixture and the side plates 18 by conduction and radiation is minimized. The radiator panels 35, also heated by the magnetic field, radiate energy toward the fixtures 39 to avoid a net radiation loss from the fixtures thus helping to maintain their temperature near the core block temperature. These fixtures 39 are used during the induction brazing process even if only one heat exchanger assembly is being processed.

Where several assemblies are placed side by side in the coil 30 the fixtures or heat panels 39 are still used but in addition, as shown in FIGS. 4 and 8, the two outer assemblies 10 are protected from undue radiation loss by radiator panels 37 positioned adjacent the outer side surfaces of the assemblies 10. As shown in FIG. 8 these panels are supported on the inside of the coil 30 although they could also be supported on the same hanger, not shown, which holds the assemblies 10 within the coil 30. With the radiator panels 37 thus disposed and heated to a temperature near that of the assemblies 10 a net radiation loss laterally from the outside assemblies is reduced or prevented so that the outside assemblies can be heated to the same temperature as the center assembly. The heat panels 35, 37 and 39 are made of 1008 steel or other low carbon steel sheet and are 0.031 inch thick. The panels 37 are 10 inches square and are spaced ¼ inch laterally from the headers. In practice, when the assemblies 10 are inductively heated as to their brazing temperature range of 1095° to 1120° F. the panel 37 is inductively heated to a temperature of approximately 1000° F. At the same time the heat panels 39 on the ends of the assemblies 10 reach about the same temperature as the core block and the end radiator panels 35 reach a temperature the same as or higher than the core block. Those differences in temperatures are due to the differences of positioning of the panels 35 and 37 in the magnetic field, the panels 35 being parallel to the lines of flux so that they are less effectively heated than the panels 37 which are transverse to the lines of flux. In either case the temperature of the panel is close to the temperature of the assemblies so that any net heat transfer to or from portions of an assembly 10 is small enough that the assemblies can be uniformly heated to the proper brazing temperature.

The characteristics of the heat panels can be altered to suit the thermal requirements of the application by using different thickness sheet, different shapes, or materials of different resistivity. For example, marginal slits along the sides of the panels 35 near the middle of the panels alters the induced current path enough to reduce the temperature of the middle of the panels while maintaining a higher temperature at the upper and lower ends, thereby tailoring the temperature profile of the panel and hence the radiation pattern therefrom. This assures better heating of the ends of the headers 12. The upper surfaces of the headers 12 are subject to heat loss by radiation but the loss will be essentially the same for all of them. The cooling effect on the headers is compensated for by choosing the angle A (FIG. 1) to obtain uniform heating of the headers and core block.

FIGS. 10 and 11 show another type of heat exchanger assembly wherein separate elements are joined together by vacuum induction brazing and heat panels are used to prevent the radiant cooling of the outside elements of the assembly. As shown in FIG. 10 the heat exchanger is comprised of a plurality of sheet aluminum elements 70 which are preferably clad on both sides with an aluminum brazing alloy, which elements are stacked together in a way to form internal passages and external spaces. A sinuous aluminum ribbon 72 is inserted into each of the external spaces and is brazed to the outside surfaces of the elements 70. As shown in FIG. 11, each element 70 comprises an elongated sheet round at its ends and having at each end a cup 74 with a central aperture 76 and an elongated boss 78 of shallower depth than the cups 74 which interconnects the cups 74. A flat margin 80 extends around the element. The elements are stacked in pairs so that each pair when joined at their margins 80 form a cavity at each end defined by the cups 74 and a channel between the cavities formed by the bosses 78. The pairs of elements are stacked together so that the external surfaces of the cups 74 are joined together to form a continuous connection of the cavities allowing fluid flow from one to another through the apertures 76. The stacked array of elements 70 and the ribbons 72 are placed in a magnetic field represented in FIG. 10 by the arrows 82 which extends perpendicular to the general plane of each element 70. Steel fixtures or heat panels 84 contact opposite sides of the stacked assembly for holding the assembly together and for heating by the magnetic field to avoid net radiation losses from the outer elements 70 of the assembly during the heating operation. Additional radiator panels 86 surround each round end of the assembly for preventing a net heat loss from the cups which have substantial radiation area. This arrangement serves to illustrate the wide application of the radiator panels and fixtures in maintaining uniformity of heating, that is, it can be used when the elements being heated are in contact as in FIG. 10, as well as when the heated members are spaced as shown in FIG. 8. It is further illustrated that the heat panels may be perpendicular to the magnetic field lines as shown by panels 84 in FIG. 10, parallel to the field lines as in the case of panels 86 or at a transverse angle to the lines as in the case of the panels 35 in FIGS. 4 and 8.

It will thus be seen that in accordance with this invention induction heating of an assembly, even a complex assembly, and even multiples of such assemblies being heated simultaneously can be carried out with close temperature control to effect uniform heating by the appropriate placement of radiator panels to be heated by the magnetic field for avoiding or offsetting any significant radiant energy loss from the member being heated. In this manner induction brazing of aluminum heat exchangers is made practical even though stringent temperature requirements must be met.

The embodiments of the invention in which an exclusive property or privilege is claimed are defined as follows:

1. A method of inductively heating a plurality of metal members to a substantially uniform temperature comprising the steps of:
    placing at least two adjacent members in a heating cavity so that during inductive heating outer member surfaces not facing another heated member will tend to lose heat by radiation,
    locating metal radiator panels in the heating cavity adjacent the said outer member surfaces, and
    establishing an alternating magnetic field in the heating cavity for inductively heating the members and for inductively heating the radiator panels to a temperature near that of the members whereby the heated panels radiate toward the outer member surfaces to reduce the net radiation from the outer member surfaces to provide uniform heating of the elements.

2. A method of inductively heating an assembly of metal elements to a substantially uniform temperature, the assembly having exposed surfaces subject to cooling by radiation loss whereby an undesirable temperature differential tends to arise, comprising the steps of:
    locating metal heat panels with surfaces opposed to the said exposed surfaces, and
    establishing an alternating magnetic field for inductively heating the assembly and for inductively heating the heat panels to a temperature near that of the assembly whereby the heat panels reduce the net radiation from the exposed surfaces to provide uniform heating of the elements.

3. A method of inductively heating a plurality of adjacent metal elements to a substantially uniform temperature wherein some of the elements have exposed surfaces which are disposed to suffer a net loss of energy by radiation so that those elements tend to have a lower temperature than the other elements comprising the steps of:
    locating metal radiator panels with surfaces opposed to the said exposed element surfaces, and
    establishing an alternating magnetic field for inductively heating the elements and for inductively heating the radiator panels to a temperature near that of the elements whereby the heated radiator panels supply radiant energy to the exposed surfaces to reduce the net radiation from the exposed element surfaces to enhance uniform heating of the elements.

4. A method of inductively heating to a substantially uniform temperature a plurality of assemblies arranged in a parallel array bounded by outer assemblies wherein a mutual exchange of radiant energy occurs between adjacent assemblies and the outer assemblies tend to experience a net radiant energy loss, comprising the steps of:
locating metal radiator panels adjacent the said outer assemblies, and
establishing an alternating magnetic field for inductively heating the assemblies and for inductively heating the radiator panels to a temperature near that of the assemblies whereby the radiation from the heated panels compensates for the radiation lost from the outer assemblies to provide uniform heating of the assemblies.

5. A method of brazing by inductively heating to a substantially uniform temperature a plurality of assemblies each including joints containing a brazing alloy, the assemblies arranged in a parallel array bounded by outer assemblies wherein a mutual exchange of radiant energy occurs between adjacent assemblies and the outer assemblies tend to experience a net radiant energy loss, comprising the steps of:
locating metal radiator panels adjacent the said outer assemblies, and
establishing an alternating magnetic field for inductively heating the assemblies to a temperature sufficient to fuse the brazing alloy thereby brazing the joints and for inductively heating the radiator panels to a temperature near that of the assemblies whereby the radiation from the heated panels compensates for the radiation lost from the outer assemblies to provide uniform heating of the assemblies.

6. A method of inductively heating a plurality of stacked metal elements to a substantially uniform temperature for brazing the elements together wherein the major outer surface areas of the stack tend to experience a net energy loss, comprising the steps of:
locating metal heat panels adjacent the said outer surface areas, and
establishing an alternating magnetic field for inductively heating the elements and for inductively heating the heat panels to a temperature near that of the elements whereby the heat panels transfer energy to the outer surface areas to reduce the net loss from the outer surface areas to provide uniform heating throughout the stack of elements.

7. A method of induction brazing a heat exchanger comprising a plurality of stacked metal elements contacting one another at joints to be brazed and consisting of core metal clad with a brazing metal which has a slightly lower melting point that the core metal wherein the outer elements of the stack tend to experience a net radiant energy loss, comprising the steps of:
compressing the stack between metal fixtures engaging the said outer element surfaces, and
establishing an alternating magnetic field for inductively heating the elements to a temperature sufficient to melt the brazing metal and for inductively heating the fixtures to a temperature near that of the elements whereby the heated fixtures transfer energy to the outer elements to reduce the net energy loss from the outer element surfaces to provide uniform heating throughout the stack of elements.

8. A method of similarly brazing a plurality of joints of a heat exchanger that is formed of a plurality of elements comprised of aluminum base material clad with an aluminum brazing alloy by induction heating wherein the major outer surface areas of the heat exchanger tend to experience a net heat energy loss, comprising the steps of:
locating metal heat panels adjacent the said outer surface areas, and
establishing an alternating magnetic field for inductively heating the elements to a temperature sufficient to cause brazing without melting the base material by and for inductively heating the heat panels to a temperature near that of the elements whereby the heat panels transfer energy to the outer surface areas to reduce the net loss from the outer surface areas to provide uniform heating sufficient to cause brazing throughout the stack of elements.

* * * * *